3,809,752
ANTI-OBESITY PROCESS
William H. Fishman, 56 Mason Terrace, Brookline, Mass. 02146, and Wilem G. Linscheer, 1 Kirby Drive, Canton, Mass. 02021
No Drawing. Filed Mar. 24, 1971, Ser. No. 127,824
Int. Cl. A61k 27/00
U.S. Cl. 424—224    12 Claims

ABSTRACT OF THE DISCLOSURE

The intestinal absorption of fatty acids is inhibited by the administration of specific inhibitors for intestinal alkaline phosphatase. Inhibition is temporary and reversible.

---

The invention described herein was made in part, in the course of work under a grant from the Department of Health, Education and Welfare.

FIELD OF THE INVENTION

This invention involves a process of the bio-affecting, and body treating type. It makes use of organic active ingredients which are specific enzyme inhibitors. The inhibitors are administered orally to animals including man for the purpose of reducing intestinal absorption of lipids including triglycerides for weight control and other therapeutic purposes.

DESCRIPTION OF THE PRIOR ART

Prior methods for reducing dietary caloric intake for weight control purposes have involved the use of special diets planned by a dietician and the use of formula diets to replace the normal food intake. Drugs which have been used include the anorexiogenic agents which function through the central nervous system to reduce appetite, and some attention has been given to the use of peristaltic stimulants. The purpose of the latter was to speed nutrients through the intestines to reduce the efficiency of absorption. The prior art has not given attention to the use of absorption inhibitors for specific types of nutrients for the purpose of reducing caloric intake.

Specifically, it has not been previously suggested to induce a state of physiologically controlled steatorrhea by the administration of fat absorption inhibitors for the purpose of weight control. Extensive research of a fundamental nature has been done to elucidate the mechanism by which fats and other lipids are absorbed from the mammalian intestine. This is summarized in textbooks on biochemistry. The concept today is a partial hydrolysis of the glycerides effected by pancreatic lipase giving rise to fatty acids and monoglycerides which together with the bile acids form association complexes called micelles which are taken up by the intestinal mucosa. Much of dietary cholesterol is esterified with long chain fatty acids, and the route of their absorption is that of fat absorption. Fishman and Ghosh in "Advances in Clinical Chemistry," vol. 10, Academic Press, New York, 1967, pp. 317 and 318, and Glickman et al. in Biochimica et Biophysica Acta, 201, 220–235 (1970) have reviewed the relation of the enzyme intestinal alkaline phosphatase to the absorption of fatty acids as part of the foregoing process.

SUMMARY OF THE INVENTION

The present invention involves a process for interfering with lipid absorption for weight reduction and other purposes through the induction of a physiologically-controlled steatorrhea as a result of marked interference with the intestinal absorption of fatty acids. The steatorrheal condition is induced by the oral administration of effective amounts of specific and physiologically acceptable inhibitors of the enzyme intestinal alkaline phosphatase.

This invention is based upon our discovery that intestinal alkaline phosphatase, the organic phosphate hydrolyzing enzyme of the intestine, plays an active role in the absorption of fatty acids by the intestine, and that inhibition of this enzyme by specific physiologically acceptable inhibitors therefore reduces fatty acid absorption. Interference with fatty acid absorption is of interest therapeutically since fatty acd absorption plays an important role not only in the assimilation of dietary fats, but also of other lipids such as cholesterol.

The expression "specific physiologically acceptable inhibitors" as used herein with reference to intestinal alkaline phosphatase is intended to refer to inhibitors of the enzyme activity thereof which are nontoxic and physiologically tolerable to the oral and gastrointestinal mucosa, not destructive of the tissues, and whose effect is temporary or reversible. The term is intended to refer to substances which specifically interfere with the activity of this enzyme, but not other enzymes, and to exclude general enzyme poisons or non-specific inhibitors such as the heavy metal ions, silver, cadmium, and mercury, organic mercurials, N-ethylmaleimide, and inhibitors of protein synthesis such as acetoxycycloheximide. One example of a physiologically acceptable inhibitor of intestinal alkaline phosphatase is known, and others are described herein for the first time.

Classical theory of enzyme inhibition refers to competitive, noncompetitive, and uncompetitive inhibitors. The way in which such inhibitors function is explained by reference to the equation

$$E + S \rightleftarrows [ES] \rightleftarrows P + E$$

in which "S" refers to the substrate on which the enzyme "E" functions to produce products "P." The intermediate enzyme-substrate complex is represented by [ES] which decomposes or reacts with another reactant such as water in the case of hydrolytic processes to yield the product "P." The active enzyme "E" is thereby regenerated and the cycle repeats.

Competitive inhibitors are believed to function by forming an enzyme inhibitor complex [EI] in competition with formation of enzyme-substrate [ES] complex thus reducing the number of active enzyme molecules available for the substrate. Noncompetitive inhibitors function in the same way except that the enzyme inhibitor complex is stable and the enzyme is thus not available for reaction with the substrate.

Distinguished from these two modes of action is that of so-called uncompetitive inhibition according to which the inhibitor forms a relatively stable complex [ESI] with the intermediate enzyme substrate complex [ES] thus preventing formation of products by the normal decomposition of the enzyme substrate complex or interaction thereof with other reactants. Inhibitors of this type are characterized by the fact that they are only active when in the presence of both enzyme and substrate.

Each of the foregoing types of inhibitor is applicable in the present invention.

Intestinal alkaline phosphatase, the enzyme "E" in the foregoing equation with which the present invention is involved, is a member of the large family of phosphatases which occur normally in various mammalian tissues. The substrate "S" of the foregoing equation on which the phosphatases including intestinal alkaline phosphatase operate is a member of a large class of organic compounds which occur in physiological systems known as organic phosphates and more precisely as organic monoesters of orthophosphoric acid. The phosphatases are not known to act directly on fats per se. The various enzymes of this family are classified according to their pH of optimum activity. The alkaline phosphatases of bone, kidney, placenta, and intestinal mucosa are most effective within the range pH 8.6–10.7. The textbook "Clinical Chemistry: Principles and Techniques" by Richard J. Henry, M.D., Harper and Row Publishers, New York, 1964, pp. 482–486 contains background information on the phosphatases.

A great variety of organic phosphate esters are hydrolyzed under the influence of the phosphatase enzymes. A number of those which are physiologically acceptable for oral administration in accordance with one embodiment of the present invention are listed below.

β-glycerophosphate
hexyl phosphate
hexose monophosphate
3'-adenylic acid
5'-adenylic acid
o-carboxyphenyl phosphate
phosphorenol pyruvate
glucose-6-phosphate
pyridoxal phosphate
uridine-3'-phosphate Many other phosphate monoesters suitable as substrates for the phosphatases are known to the art. With respect to the present invention and considering the requirement for physiological acceptability these substances generally contain up to about 24 carbon atoms and contain only the elements carbon, hydrogen, oxygen, and sometimes nitrogen in addition to phosphorus. The inhibitors of intestinal alkaline phosphatase with which the present invention is concerned are specific for the alkaline phosphatase of the intestine and have little or no effect on alkaline phosphatases of other tissues such as kidney and bone. These inhibitors are, however, effective against alkaline phosphatase of the placenta but this does not interfere with operation of the present invention since heroic weight reduction measures such as are involved with the present invention are not normally applied to pregnant women. Enzyme specificity is important since the object is to interfere only with the function of intestinal alkaline phosphatase in fat absorption and not to interfere with the normal operation of other phosphatases such as those of bone as in osteogenesis.

The art is aware of at least one specific inhibitor of intestinal and placental alkaline phosphatase, namely L-phenylalanine which is an uncompetitive inhibitor and thus functions only in the presence of an organic phosphate monoester substrate for the enzyme such as those referred to above. Refer to Fishman & Ghosh "Advances in Clinical Chemistry," Academic Press, New York, 1967, vol. X, p. 284. It has now been found that a number of other alanine derivatives are tissue specific uncompetitive inhibitors of intestinal alkaline phosphatase and accordingly are useful in the present invention in combination with organic phosphate ester substrates for the enzyme. These substances have the following formula:

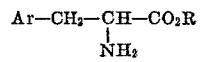

in which Ar is phenyl 3-indolyl, or 2-thienyl each of which may be either unsubstituted or substituted by up to 1 fluorine atom, and R is hydrogen or lower alkyl group having up to 4 carbon atoms. In other words L-phenylalanine, L-tryptophan, L-thienylalanine, alone or in racemic mixture, lower alkyl esters, and ring monofluorinated analogs thereof are examples of uncompetitive inhibitors useful in the present invention. These substances are stereo specific by which is meant that only the L-form or the D,L- form is effective in enzyme inhibition. The D- form in each instance is inactive.

In addition to the foregoing we have discovered another group of substances which are specific physiologically acceptable inhibitors of intestinal and placental alkaline phosphatase. These substances are known compounds and include the phosphate monoesters of the 4 and 5 carbon atom alkanols, and acetyl phosphate. The substances are operable in the present invention but differ mechanistically in operation from the alanine derivatives referred to above in that they are competitive inhibitors of the enzyme. Thus they need not be used in combination with a second substrate ingredient as is necessary for the uncompetitive inhibitors, but rather can be administered as individual dosage units. They are somewhat less efficient than the uncompetitive inhibitory alanine derivatives referred to above. An especially effective embodiment of the present invention involves use of one of the uncompetitive inhibitor alanine derivatives described above in combination with one of these phosphates which then serves the dual functions of competitive inhibitor and supporting phosphate ester substrate for the uncompetitive inhibitor alanine compound.

The invention is practiced by administering orally to a mammal the inhibitor for intestinal alkaline phosphatase concomitant to the ingestion of fats, that is at mealtime, in doses sufficient to provide an effective concentration thereof in the intestine. The effective concentration may vary from case to case but it is believed that all physiologically tolerable concentrations at the locus of intestinal fatty acid absorption of at least about 10 millimoles per liter of intestinal contents of

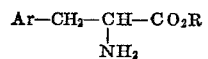

as defined above and at least about 5 millimoles per liter of phosphate ester are generally operable. The inhibitors may be administered mixed with the food constituents or as pharmaceutical dosage forms such as capsules, tablets, elixirs, etc. In some instances it is desirable to use an enteric coated tablet or capsule containing the inhibitor to secure safe passage through the stomach and to the locus of intestinal fatty acid absorption. Specifically with L-phenylalanine and β-glycerophosphate as inhibitory combination, the following dosage range is recommended: 50–200 mg. per meal of L-phenylalanine (0.8 to 3.3 mg./kg. of body weight), and 25 to 100 mg. per meal of β-glycerophosphate (0.4 to 1.7 mg./kg. of body weight). This range is applicable for the other

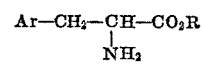

compounds listed above and also for the other pharmacologically acceptable phosphate ester substrates which are used therewith. The lower alkanol phosphate ester competitive inhibitors referred to above are preferably administered orally within the dosage range of 25 mg. to 100 mg. per meal (0.4 to 1.7 mg./kg. of body weight).

DESCRIPTION OF SPECIFIC EMBODIMENTS

Example 1.—Measurement of the inhibition of oleic acid absorption in human subjects The four lumen 2 balloon tube technique described by Willem G. Linscheer et al. in Journal of Clinical Investigation 45, 1317 (1966) was used to isolate and to perfuse 30 centimeters of proximal small bowel approximately 10 centimeters distal of the papilla of Vater in 12 adult human subjects. The isolated segment was first washed by perfusion of 250 ml. of isotonic saline. Then a test solution of tritium labeled oleic acid, 34.7 mm. (20 microcuries), 55.7 mm. sodium taurocholate, and 0.5 g. percent polyethylene glycol in lactose Ringer solution was perfused in 6 subjects for varying periods in excess of 90 minutes at a constant rate of 4.7 ml. per minute. The effluent was collected in separate portions for each 15 min. period. The amount of oleic acid absorbed was determined by comparing the predetermined ratio of concentrations of oleic acid and polyethylene glycol in the fresh perfusing solution to the ratio of these concentrations in the effluent to eliminate the dilution factor resulting from intestinal secretion. The oleic acid was extracted from the test solution by the method of Dole, J. Clin. Invest. 35, 150 (1956) using 5 volumes of 4/10/1 isopropanol/heptane/N-sulfuric acid (Bray's solution, Anal. Biochem. 1, 279 (1960). The radioactivity of the heptane layer was determined in a Beckman scintillation counter. The polyethylene glycol was determined by the method of Hyden, Ann. Roy. Agr. Coll. Sweden, 22, 139 (1955). The 6 remaining subjects were treated by perfusion according to the same technique with a similar solution of oleic acid, sodium taurocholate, and polyethylene glycol which in addition contained L-phenylalanine at a concentration of 10 mm. and β-glycerophosphate at a concentration of 5 mm. as absorption inhibitors. The perfusion times varied from 45 minutes to 3 hrs. for this group. The rate of oleic acid absorption for the first group of 6 subjects (no inhibitor) ranged from 32 to 48 millimoles per min. with an average value of 43 millimoles per min. In the second group of patients (co-inhibitors L-phenylalanine, β-glycerophosphate) oleic acid absorption was completely blocked in three of the patients and the maximum absorption observed in the other 3 patients was 10 millimoles per minute for an average value for the 6 patients of 7 millimoles per min. This represents an 84% inhibition of oleic acid absorption by the administration of L-phenylalanine and β-glycerophosphate.

Example 2.—In vitro enzyme inhibitory activity of various compounds useful in the process of the present invention An alkaline phosphatase preparation was prepared from human placenta according to a standardized technique described by Ghosh, N. K., and Fishman, W. H., Biochem. J., 108, 779 (1968). Placental alkaline phosphatase responds to tissue specific enzyme inhibitors such as 1-phenylalanine in the same way as intestinal alkaline phosphatase (Fishman and Ghosh, Advances in Clinical Chemistry, vol. X, p. 284 (1967)). The placental enzyme is convenient for screening purposes because it is more readily available than the intestinal enzyme. The enzyme preparation employed had an activity of 12.75 units per mg. of protein. Enzyme assays were conducted by mixing 0.2 ml. of enzyme preparation after dilution 1:200 with 0.1% bovine serum albumin with 50 millimoles of pH 9.8 carbonate-bicarbonate buffer and 18 millimoles of disodium phenylphosphate substrate (total volume 1 ml.) and incubating at 37° C. for 15 min. The buffer substrate mixture was preincubated for 5 min. at 37° C. before adding the enzyme. The phenol liberated was estimated by the method of Powell and Smith, J. Clin. Pathol. 7, 245 (1954). One unit of enzyme was defined as that amount which liberates 1 millimole of phenol in the foregoing test. To evaluate inhibitor compounds the same test was used but the test compound was incorporated in the buffer-substrate enzyme digest in parallel tests at concentrations of 1 mm. and 10 mm. Based on the amount of phenol liberated in the assay procedure, the percent inhibition of the placental alkaline phosphatase preparation by the test compound was calculated. The following substances each exerted a degree of inhibition in excess of 60% when tested at the 10 mm. concentration. In corresponding tests using alkaline phosphatase preparations from other tissues such as liver, these substances proved to be either inactive or only weakly active. They are tissue specific uncompetitive inhibitors of intestinal alkaline phosphatase useful in the process of the present invention. The inhibition of fatty acid absorption in man may be demonstrated by substitution of each of these in equimolar amount for 1-phenylalanine in the procedure described in Example 1. They may be administered in the same dose used for L-phenylalanine.

L-phenylalanine
D,L-phenylalanine
D,L-m-fluorophenylalanine
D,L-p-fluorophenylalanine
L-phenylalanine methyl ester
L-phenylalanine ethyl ester
L-tryptophan
D,L-trypotophan
D,L-5-fluorotryptophan
L-tryptophan methyl ester
L-tryptophan ethyl ester
2-thienylalanine Example 3.—Phosphate ester competitive inhibitors The following substances when tested in the system described in Example 2 as the sole test agent incorporated in the digest (both L-phenylalanine and β-glycerophosphate absent) where found to inhibit placental alkaline phosphatase in excess of 60%, but to be substantially inactive against liver phosphatase (<23% inhibition). They are thus specific inhibitors useful in the process of the present invention at a dose sufficient to provide an intestinal concentration thereof of 10 mm.

secondary butyl phosphate
isobutyl phosphate
N-butyl phosphate
N-amyl phosphate
tert.-butyl phosphate
isoamyl phosphate
acetyl phosphate

What is claimed is:
1. The process for inhibiting intestinal fatty acid absorption by a mammal which comprises introducing into the small intestine by oral administration an effective amount of a combination of a specific physiologically acceptable uncompetitive inhibitor of the activity of the enzyme intestinal alkaline phosphatase having the formula

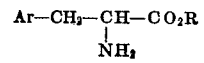

wherein Ar is phenyl, 3-indolyl, 2-thienyl, and the ring monofluoro substitutes of each, and R is hydrogen or lower alkyl having up to 4 carbon atoms administered in a dose of from 0.8 to 3.3 mg./kg. of body weight of said mammal with a dose of from 0.4 to 1.7 mg./kg. of body weight of said mammal of a phosphate ester substrate for said enzyme.

2. The process of claim 1 wherein said uncompetitive inhibitor is L-phenylalanine.

3. The process of claim 1 wherein said uncompetitive inhibitor is L-phenylalanine and said substrate is β-glycerophosphate.

4. The process of claim 1 wherein said phosphate ester substrate is a competitive inhibitor of said enzyme.

5. The process of claim 1 wherein the amounts of said

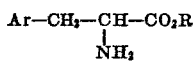

and said phosphate ester substrate are sufficient to provide concentrations thereof of at least 10 mm. and 5 mm. thereof respectively at the locus of intestinal fatty acid absorption.

6. The process of claim 1 wherein said inhibitor is administered orally concomitant to fat ingsetion.

7. The process of claim 1 wherein said phosphate ester substrate is n-butyl phosphate.

8. The process of claim 1 wherein said phosphate ester substrate is sec.-butyl phosphate.

9. The process of claim 1 wherein said phosphate ester substance is isobutyl phosphate.

10. The process of claim 1 wherein said phosphate ester substance is tert.-butyl phosphate.

11. The process of claim 1 wherein said phosphate ester substrate is n-amyl phosphate.

12. The process of claim 1 wherein said phosphate ester substrate is isoamyl phosphate.

No references cited.

STANLEY J. FRIEDMAN, Primary Examiner

U.S. Cl. X.R.

424—274, 275, 309, 319